(12) United States Patent
Bentall

(10) Patent No.: US 10,200,408 B2
(45) Date of Patent: Feb. 5, 2019

(54) COMPUTER NETWORK SECURITY

(75) Inventor: Mark Bentall, Newport (GB)

(73) Assignee: EADS Defence and Security Systems Limited, Newport (GB)

( * ) Notice: Subject to any disclaimer, the term of this patent is extended or adjusted under 35 U.S.C. 154(b) by 618 days.

(21) Appl. No.: 12/735,192

(22) PCT Filed: Dec. 19, 2008

(86) PCT No.: PCT/GB2008/004235
§ 371 (c)(1),
(2), (4) Date: Sep. 28, 2010

(87) PCT Pub. No.: WO2009/077770
PCT Pub. Date: Jun. 25, 2009

(65) Prior Publication Data
US 2012/0096510 A1   Apr. 19, 2012

(30) Foreign Application Priority Data

Dec. 19, 2007   (GB) .................................. 0724758.8

(51) Int. Cl.
*H04L 29/06*   (2006.01)
(52) U.S. Cl.
CPC .................... *H04L 63/20* (2013.01)
(58) Field of Classification Search
CPC ............... H04L 63/20; H04L 29/06986; H04L 29/06578; H04W 12/08
USPC .......................................................... 726/1
See application file for complete search history.

(56) References Cited

U.S. PATENT DOCUMENTS

| | | | | |
|---|---|---|---|---|
| 5,517,663 A | * | 5/1996 | Kahn | .................... G06F 3/0481 345/473 |
| 6,725,399 B1 | * | 4/2004 | Bowman | ............. G06F 11/3664 714/38.14 |
| 7,231,668 B2 | * | 6/2007 | Jacobson | ........................ 726/26 |
| 8,255,784 B2 | * | 8/2012 | Masui | ................ H04N 1/00209 358/402 |
| 2003/0126464 A1 | * | 7/2003 | McDaniel et al. | ............. 713/201 |
| 2004/0181689 A1 | * | 9/2004 | Kiyoto et al. | ................. 713/201 |
| 2004/0199648 A1 | * | 10/2004 | Shelest et al. | ................ 709/229 |
| 2004/0215978 A1 | | 10/2004 | Okajo et al. | |
| 2005/0182957 A1 | * | 8/2005 | Della-Libera et al. | ........ 713/200 |
| 2007/0143850 A1 | * | 6/2007 | Kraemer et al. | ................. 726/25 |

(Continued)

FOREIGN PATENT DOCUMENTS

| | | |
|---|---|---|
| EP | 1758025 A2 | 2/2007 |
| WO | WO 2004/075006 A2 | 9/2004 |
| WO | WO 2006/093917 A2 | 9/2006 |

OTHER PUBLICATIONS

Dr. Toby Sucharov of Erudine, "Erudine Cannot Become Legacy", Erudine, North Yorkshire, England, Copyright: Remote Operations Limited (trading as Erudine) 2010.

(Continued)

*Primary Examiner* — Esther B. Henderson
(74) *Attorney, Agent, or Firm* — Stout Uxa & Buyan LLP; Carlos A Fisher

(57) ABSTRACT

A system comprises: a representation of a network; a communications requirements file for an application to be executed by a node of said network; and a security policy file defining a security policy for said node of said network. Said files are processed to determine whether said security policy and said communication requirements are compatible.

18 Claims, 4 Drawing Sheets

(56) References Cited

U.S. PATENT DOCUMENTS

2007/0157286 A1    7/2007  Singh et al.
2007/0261121 A1*  11/2007  Jacobson ................ H04L 29/06
                                                                726/26
2007/0294743 A1*  12/2007  Kaler et al. ........................ 726/1
2008/0270104 A1*  10/2008  Stratton ................ G06F 21/577
                                                                703/23

OTHER PUBLICATIONS

Philip Rice, Dr. Toby Sucharov and Dr. Leon Sucharov of Erudine, "Unlocking Tacit Knowledge by Conclusion and Justification", Erudine, North Yorkshire, England (date unknown).
United Kingdom Search Report dated Mar. 18, 2008 in related UK Application No. GB0724758.8.
PCT International Preliminary Report on Patentability and Written Opinion dated Jul. 1, 2010 in related PCT Application No. PCT/GB2008/004235.
International Search Report dated Jul. 2, 2009 in corresponding PCT Application No. PCT/GB2008/004235.

* cited by examiner

COMPUTER NETWORK SECURITY

This invention relates to the design of computer networks. In particular, the present invention is directed to security in computer network systems and to the management of the trade-off between security and usability of computer network systems.

It is well known in the field of information technology security to provide one or more firewalls as a security feature of a network. Typically, a firewall is used to control data traffic between an internal network and the outside world (often in the form of the Internet). In use, a firewall typically allows data packets arriving at the firewall to pass into an internal network only when that data meets certain requirements. In this way, the exposure of the internal network to problems such as viruses is reduced, and the likelihood of data within the network being vulnerable from action taken outside the network is reduced.

Figure 1:
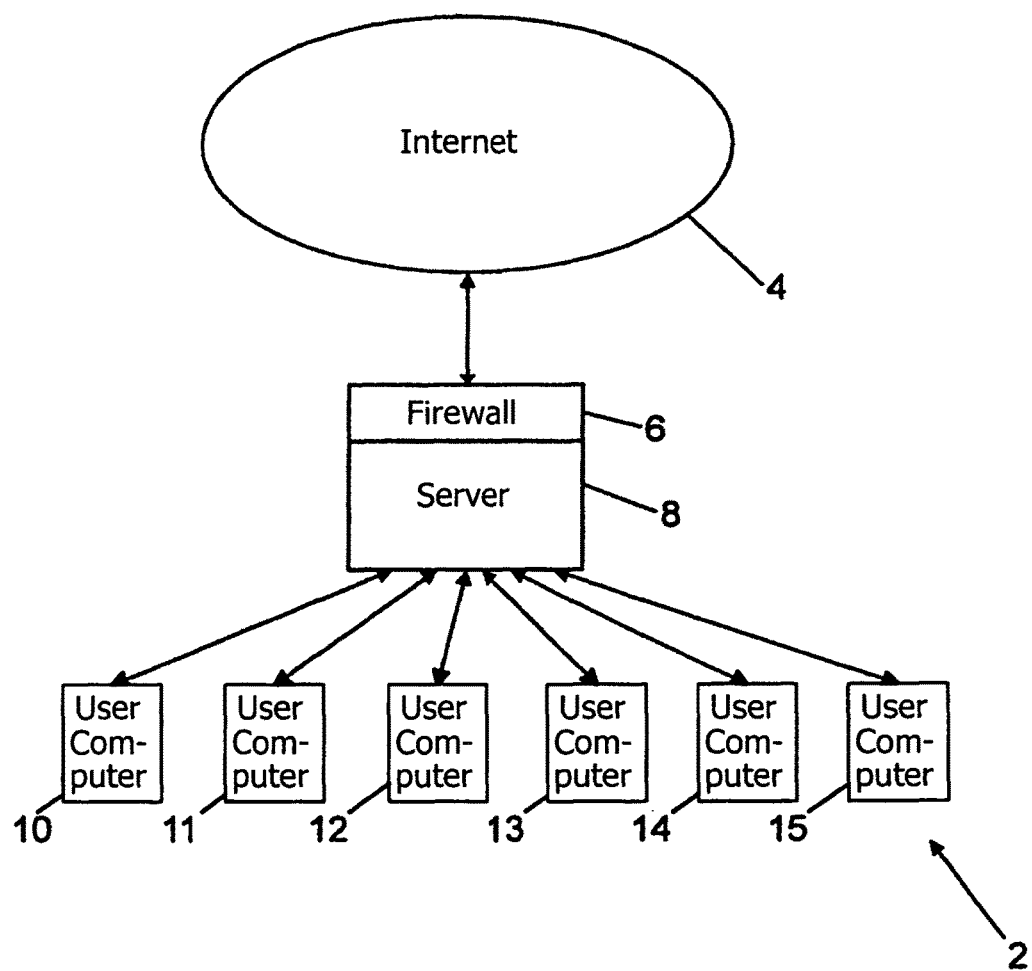

FIG. 1 shows a typical network arrangement, indicated generally by the reference numeral 2, incorporating a server 8 and a number of user computers 10 to 15 connected together as an internal network. The network is connected to a second network 4 (typically an external network, such as the Internet) via a firewall 6; the firewall 6 controls the flow of data between the second network 4 and the internal network.

Clearly, the more restrictive the firewall 6, the less likely it is that security problems will be caused by the flow of data between the internal network and the second network 4. However, such restrictions also restrict the functionality of user computers 10 to 15. For example, a firewall may prevent a user from accessing data that is stored on a computer outside the local network. If that data is required for a particular purpose, then the security provided by the firewall 6 is at the expense of restricting a user from gaining required data. Clearly, a balance needs to be struck between security and functionality.

The data that the firewall 6 allows to pass may be dependent on the user that is requesting access to that data. Thus, different users or groups of users within a network may be allowed to access different types of information. Such an arrangement can be managed by providing a set of security policies, with different users being assigned to a different security profile.

By way of example, the following security levels could be provided:
Level 1—No data is allowed to pass through the firewall in either direction.
Level 2—Data is allowed to leave the network from a level 2 user, but is not allowed to enter the network.
Level 3—Data is allowed to pass through the firewall in either direction to/from a level 3 user.

Security profiles are typically more sophisticated than the simple three-level system outlined above. For example, different users may be given different access for different applications, or for different projects. For example, users may be able to access data that is stored outside a local network when using a first application, for which that access is essential, but may not be able to access data outside the local network when using a second application, for which such access is not essential.

A first problem caused by security policies is that if they are too restrictive they can prevent some software applications from working as intended or at all. A second problem caused by security policies is that, if they are not restrictive enough, security breaches can occur. Accordingly, the aim of any security policy is to provided a balance between the security and usability of a computer network.

Figure 2:
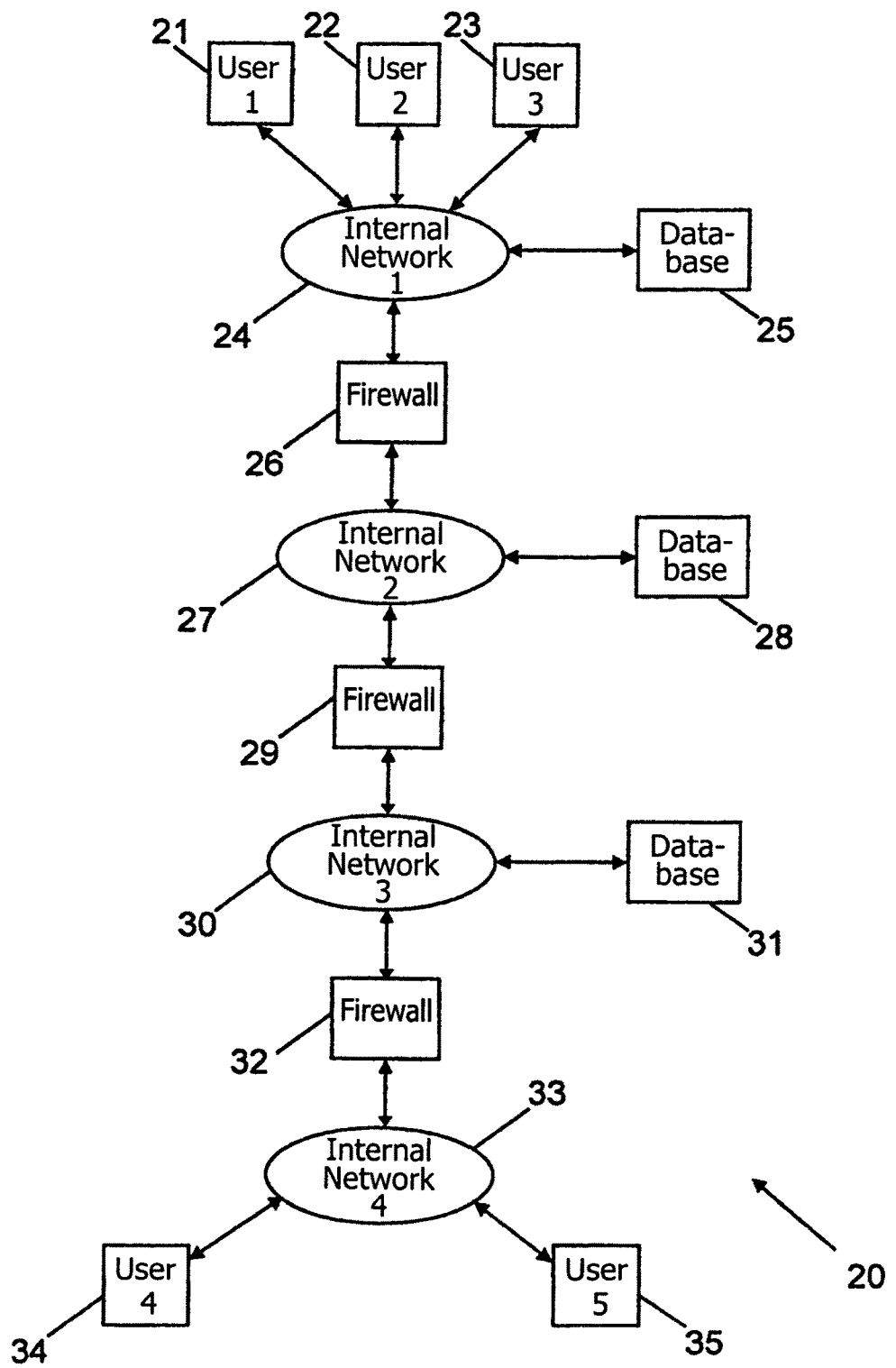

By way of example, consider scenario shown in FIG. 2.

FIG. 2 shows a system, indicated generally by the reference numeral 20 comprising first 21, second 22 and third 23 users, each connected to a first internal network 24. Each of the users 21 to 23 are part of the human resources department of a company and the first internal network 24 is the human resources network. Also connected to the first internal network 24 is a database 25 containing data concerning the human resources department. Each of the first, second and third users 21 to 23 has access to the database 25 via the network 24.

The first internal network 24 is connected to a second internal network 27 via a firewall 26. The second internal network 27 is connected to a database 28 containing project-related data. The second internal network 27 is also connected to a third internal network 30 via a second firewall 29.

The third internal network 30 is connected to a database 31 containing data concerning the company's website. The third internal network 30 is connected to the Internet 33 via a third firewall 32. Finally, fourth 34 and fifth 35 users are also connected to the Internet 33.

Assume that the first user 21 is a member of the human resources department's administrative staff, second and third users 22 and 23 are more senior employees working on a number of projects, fourth user 34 is another employee working on a number of projects and fifth user 35 is a member of the public.

The first user 21 may only need access to the database 25. Accordingly, the first firewall 26 may prevent the transfer of data between the first user 21 and the second network 27.

The second and third users 22 and 23 may need access to both the first database 25 and the second database 28. Accordingly, the first firewall 26 may allow the transfer of data between the second user 22 and the second network 27 and between the third user 23 and the second network 27, but the second firewall 29 may prevent the transfer between the second and third users and the third network 30.

The fourth user may need access to the second database 28, but may not be entitled to access to the human resources database 25. Therefore, the second and third firewalls 29 and 32 may both allow the passage of data between the database 28 and the fourth user 34. The fifth user 35 may only be allowed access to the third database 31 in order to view the company's website.

Accordingly, the third firewall 32 may allow data to be transferred between the third database 39 and the fifth user 35, with the second firewall 29 blocking the passage of data to and from the fifth user 35.

Typically, the security provisions of the arrangement of systems such as the system 20 are amended on an ad hoc basis. For example, consider the scenario when the user 22 is given responsibility for some part of the company's website, the data for which is stored in the database 31. In the scenario described above, the second firewall 29 would prevent that user from accessing the data on the database 31. In order to address this problem, a skilled technician may be required to ascertain that the user's security settings are the source of the problem and to adjust those settings; of course, permission may be required before such changes can be implemented.

Such ad hoc arrangements result in increased periods of time during which new applications are not available to users, requires skilled workers to identify and correct problems, and requires management time in determining whether or not the security access rules can be relaxed. Also, such ad hoc arrangements are likely to lead to security policies being relaxed without full consideration of the implications of doing so.

The system 20 described above with reference to FIG. 2 is relatively simple. It is clear that as systems become more complicated, it quickly becomes impossible for individual technicians to remember and maintain the required security procedures.

The present invention seeks to address at least some of the problems identified above.

The present invention provides a method comprising the steps of: determining a representation of a network; determining a security policy for a node of the network; determining communications requirements for a particular application that is intended to be executed within said node of the network; and conducting an impact analysis to determine whether said communications requirements are met and/or exceeded at said node. The said network may, for example, be a computer network or a communications network.

The present invention also provides a system comprising: a representation of a network; a communications requirement file for an application to be executed by a node of said network; and a security policy file defining a security policy for said node of said network, wherein said files are processed to determine whether said security policy and said communication requirements are compatible. For example, said files may be processed to determine whether said communications requirements are met. Alternatively or in addition the files may be processed to determine whether said communications requirements are exceeded.

The present invention enables the impact of one or more security policies on an application to be determined by conducting an impact assessment. In this way, a determination of whether or not a particular application will function as required can be made before it is introduced into the network. Indeed, such determinations can be made even if the network has not been implemented.

The impact assessment may be carried out using an automated tool, such as the commercially available Erudine Behaviour Engine.

The node of the network may refer to a portion of the network, such as a particular user, a particular group of users, a particular computer terminal or a particular group of computer terminals.

The step of determining the model may comprise defining said model. Alternatively, the step of determining said model may comprise receiving said model; for example as an input file or set of input files. The method may further comprise the step of adjusting the model of said network.

The step of determining said security policy may comprise defining said security policy. Alternatively, the step of determining said security policy may comprise receiving said security policy; for example as an input file or a set of input files. The method may further comprise the step of adjusting the security policy. In one form of the invention, the security policy is either tightened or relaxed depending on the outcome of the impact analysis.

The step of determining said communications requirements may comprise defining said communications requirements. Alternatively, the step of determining said communications requirements may comprise receiving said communications requirements; for example as an input file or a set of input files. The method may further comprise the step of adjusting the communications requirements. In one form of the invention, the communication requirements file or set of files forms part of an application file or files that is associated with the application (or applications) itself.

The method may comprise the steps of adjustment to one, two or all of the representation of the system, the security policy and the communications requirements. In some embodiments, one or more of those requirements may be fixed.

Data may have to traverse several nodes between its source and its destination. One or more nodes may be grouped into a single security domain, with a common security policy for all nodes within the domain. In an example embodiment, for each application service, the compatibility of the application's communication requirements and the nodes' security policies is determined by:
  looking up the security domain for the source;
  looking up the security domain for the destination(s) defined by the application's communication requirements;
  looking up the security domains to be traversed between the source domain and the destination domain;
  determining if the communications requirements will communicate through the security domain policies of each security domain to be traversed;
  if communication is not allowed through the security domains to be traversed, reporting the application (or the relevant service associated with the application), and the domain(s) that have security policies preventing communication.

It may be that the system assumes that each host belongs to one network, and that each network is in one whole security domain.

It may be that a "block everything but" security policy is adopted by at least one or all of the security domains.

In an example embodiment, a check is made to ensure that the security policies of the domains are not too open. For each policy in a domain, at least one of the following checks may take place:
  a check is made that the policy is used; if not then the policy is deemed too open (or its need is unknown);
  a check is made as to which protocol layers are allowed, and if allowed layers are unused, the width of the policy is deemed too broad, and a check may be made as to whether protocols within the layer are used or unused (e.g. Layer 3 and 4 services may be allowed, but only TCP is used and the policy is therefore again deemed too broad);
  a check is made for open ports.

The security policy of the domain may then be adjusted in view of the results of at least one of those checks.

Figure 3:
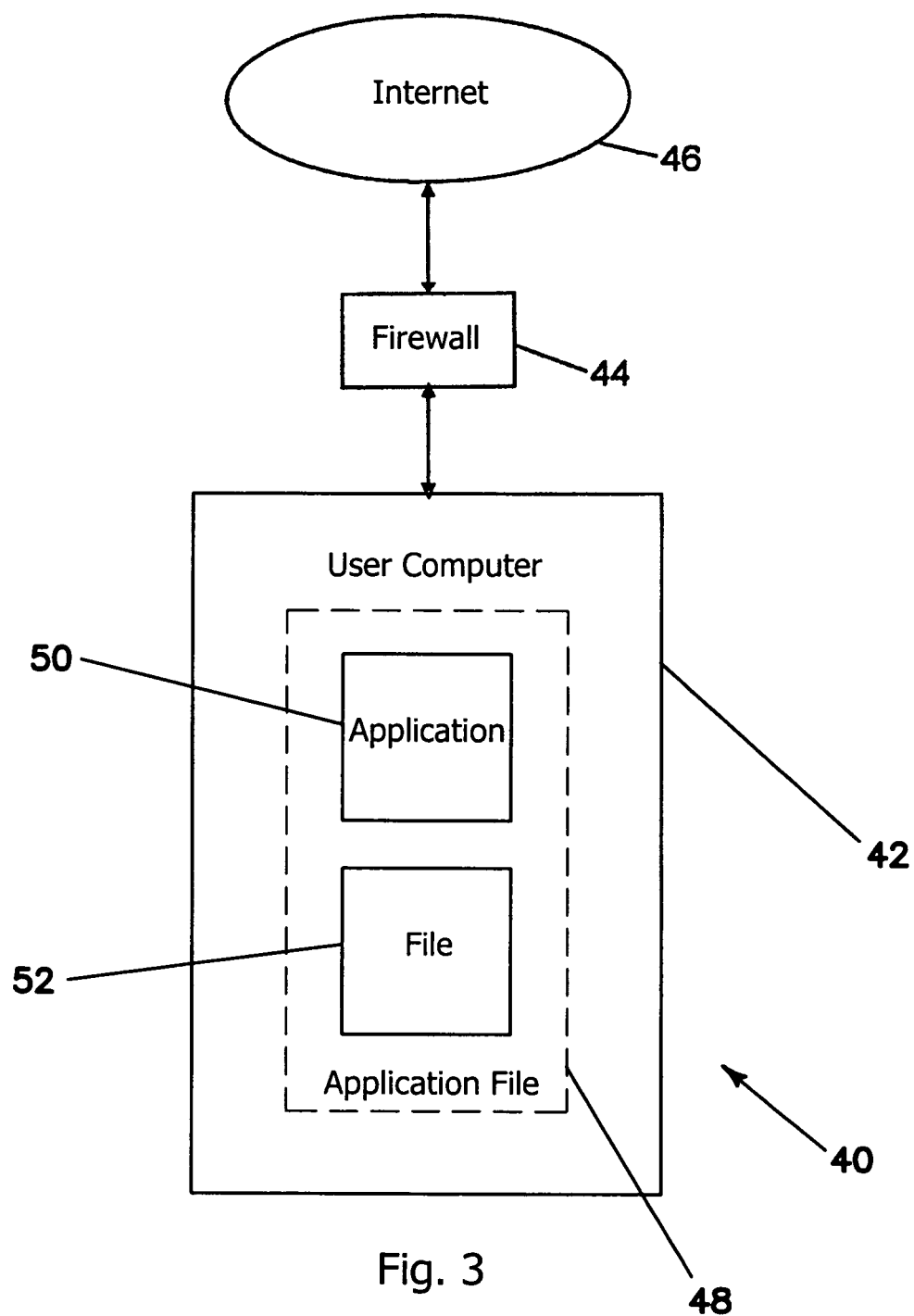
Figure 4:
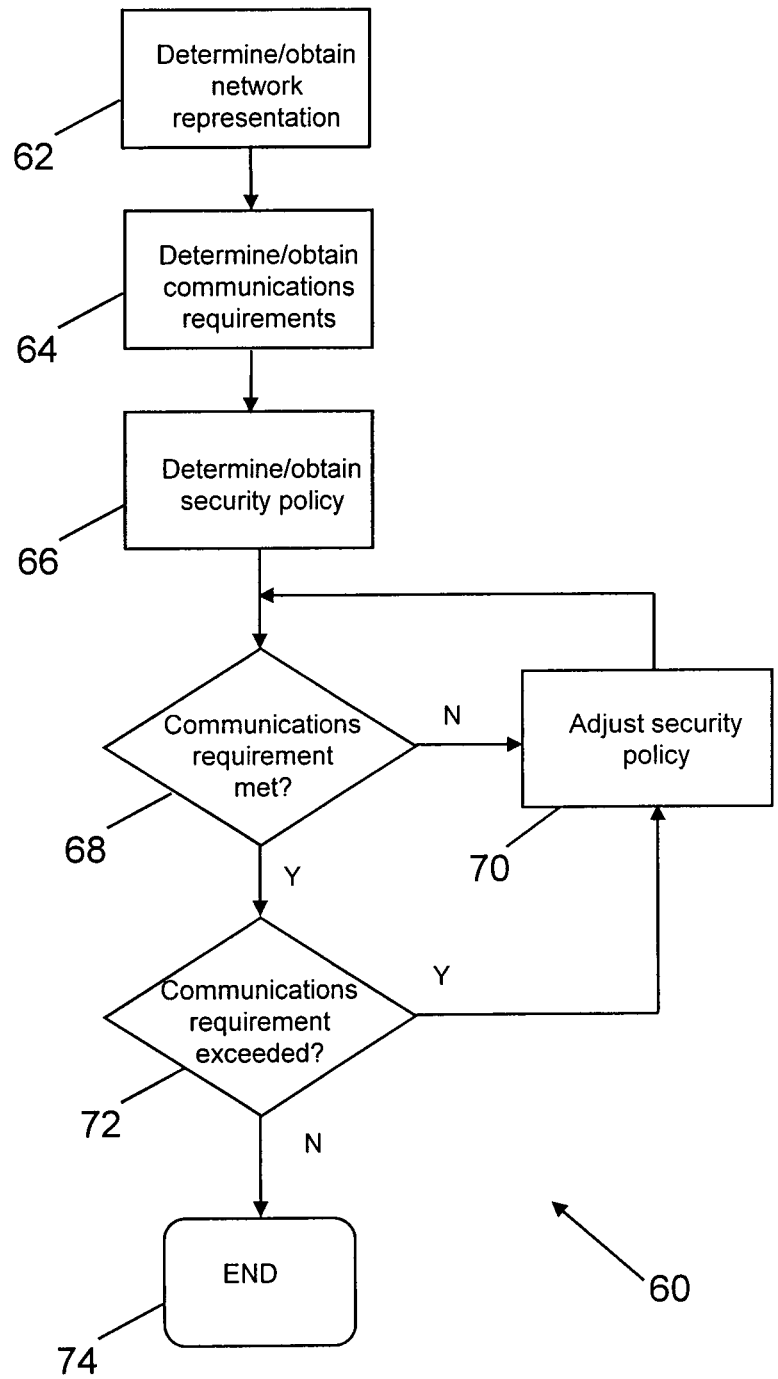

Devices and methods in accordance with the invention will now be described, by way of example only, with reference to the accompanying schematic drawings in which:

FIG. 1 is a block diagram of a known computer network;
FIG. 2 is a block diagram of a known computer network;
FIG. 3 is a block diagram demonstrating an aspect of the present invention; and
FIG. 4 is a flow chart showing an algorithm in accordance with an aspect of the present invention.

FIG. 3 shows a computer network, indicated generally by the reference numeral 40, in accordance with a first embodiment of the present invention. The network 40 comprises a user computer 42, which is coupled to the Internet 46 (or some other network) via a firewall 44. The user computer 42 includes an application 50. The application 50 is bound with a communications requirements file 52. The application 50 and its associated communications requirements file 52 form an application file 48. The constituent parts of the application file 48 can be bound together such that, if the provider of the application 50 is trusted, then the communications requirement file 52 is also trusted. In some embodiments of the invention, in order for the communications requirement file to be implemented, it must be from a trusted source.

The communications requirements file 52 sets out the communications requirements that the network 40 must provide in order for the application 50 to function correctly.

The present invention makes use of the communications requirements file when considering the effect of including the application 50 in the network 40.

FIG. 4 is a flow chart demonstrating the functionality of an aspect of the present invention. The flow chart, indicated generally by the reference numeral 60 starts at step 62, at which step a representation of the relevant network is either obtained or determined. The flow chart then moves on to step 64, at which step the communications requirement of the relevant application is either obtained or determined; for example, the communications requirement may be obtained from one or more communications requirement files 52. The flow chart then moves on to step 66, at which step the relevant security policy is obtained or determined.

From step 66, the flow chart moves to step 68. At step 68, an impact analysis technique is used to determine whether the security policy obtained at 66 is compatible with the communications requirement obtained at step 64. If the communications requirements are not met, the flow chart moves to step 70: if the communications requirements are met, the flow chart moves to step 72.

At step 72, the impact analysis technique is used to determine whether the communications requirements are exceeded. If so, the flow chart moves to step 70; otherwise, the algorithm, 60 terminates at step 74.

At step 70, the security policy is adjusted as follows. If, at step 68, it was determined that the communications requirements were not met, then the security policy is relaxed. Alternatively, if, at step 72, it was determined that the communications requirements were exceeded, then the security policy is tightened. Once the security policy has been adjusted, the algorithm returns to step 68 and the impact analysis step is repeated.

The impact analysis referred to above can be implemented in a number of ways. One exemplary system is that described in EP 1 758 025. One suitable system that is commercially available is the Erudine Behaviour Engine available from Erudine Limited, 54 East Parade, Harrogate, North Yorkshire HG1 5LT, United Kingdom (www.erudine.com).

The algorithm 60 described above with reference to FIG. 4 assumes that the communications requirements and the network configuration are fixed and that the security profile is variable. Of course, this may not be the case, since a system designer may be able to modify one or more of the communications requirements of the application and the design of the network itself in addition to, or instead of, modifying the security profile.

In this way, the impact of the introduction of a new application into the network can be assessed before the application is introduced into the real network. This enables a full impact assessment of any such application to be conducted quickly and cheaply, without disrupting a real system. Indeed, such analysis can be conducted before the system itself is implemented.

In different forms of the present invention, one or more of the network, the security policy and the communications requirements files may be fixed, thereby limited the adjustments that can be made in order to accommodate a new application into the network. The present invention provides a systematic method for predicting the effect of introducing such an application regardless of such constraints.

The invention claimed is:

1. A system comprising at least one computer, the at least one computer being equipped with software; said software including:
    a) a representation of a network comprising
        i) a plurality of other computers and
        ii) a network node;
    b) a communications requirements file having communications requirement for an application to be executed by said network node;
    c) a security policy file defining a security policy for said network node; and
    d) an automated tool configured and employed to automatically carry out an impact assessment to determine whether said communications requirements will communicate through security domain policies of each security domain to be traversed in said representation of a network, the automated tool being further configured and employed, in the event that the impact assessment determines that said security policy and said communication requirements will not communicate through security domain policies of each security domain to be traversed in said representation of a network, to
        i) automatically adjust at least one of
            A) said representation of a network,
            B) said security policy, and
            C) said communications requirements and thereafter,
        ii) automatically carry out a further impact assessment to determine whether the security policy and the communications requirements are compatible;
    the automated tool being still further configured and employed to assess the impact of the introduction of the application into a real network before the application is introduced into a real network.

2. The system of claim 1, wherein the automated tool is further configured to automatically relax the security policy in the event the communications requirements are not met in the impact assessment.

3. The system of claim 1, wherein the automated tool is further configured to automatically tighten the security policy in the event the communications requirements are exceeded in the impact assessment.

4. The system of claim 1, wherein the communications requirements file forms part of an application file.

5. The system of claim 1, wherein the automated tool comprises a behaviour engine.

6. The system of claim 1, wherein the automated tool is configured to automatically adjust more than one of the representation of a network, the security policy, and the communications requirements.

7. A method comprising the steps of:
    a) providing a software representation of a network comprising a plurality of computers and a network node, said software representation of a network residing in a system comprising at least one system computer;
    b) providing a security policy file defining a security policy for said network node on said system;
    c) providing a communications requirements file having communications requirements for a particular application that is intended to be executed within said network node on said system; and
    d) providing an automated tool on the system, the automated tool being configured and employed to automatically carry out an impact assessment to determine whether said security policy and said communications requirements are compatible, the automated tool being further configured and employed, in the event that the impact assessment determined that said security policy and said communications requirements are not compatible, to
   i) automatically adjust at least one of
      A) said representation of a network,
      B) said security policy and
      C) said communications requirements and, thereafter,
   ii) automatically carry out further impact assessment to determine whether the security policy and the communications requirements are compatible, the automated tool being still further configured and employed to assess the impact of the introduction of the application into a real network before the application is introduced into a real network.

8. The method of 7, wherein said step of providing said software representation includes at least one of defining said representation, and receiving said representation.

9. A method as claimed in claim 7, wherein said step of providing said security policy includes at least one of defining said security policy and receiving said security policy.

10. A method as claimed in claim 7, wherein said step of providing said communications requirements includes at least one of defining said communications requirements and receiving said communications requirements.

11. A method as claimed in claim 10, wherein the communications requirements are provided as part of an application file.

12. A method as claimed in claim 8, further comprising at least one of automatically adjusting the representation of said network and automatically adjusting said security policy.

13. A method as claimed in claim 12, wherein, in the event that said communications requirements are not met at said network node, said security policy is automatically relaxed.

14. A method as claimed in claim 12 wherein, in the event that said communications requirements are exceeded at said network node, said security policy is automatically tightened.

15. A method as claimed in claim 7, further comprising automatically adjusting said communications requirements.

16. A method as claimed in claim 7, wherein the automated tool comprises a behaviour engine.

17. A method comprising the steps of:
   a) providing a software representation of a network comprising a plurality of computers and a network node, said software representation of a network residing in a system comprising at least one system computer;
   b) providing a security policy file defining a security policy for said network node on said system;
   c) providing a communications requirements for a particular application that is intended to be executed within said network node on said system;
   d) providing a automated tool on the system, the automated tool being configured and employed to automatically carry out an impact assessment to determine whether said security policy and said communications requirements are compatible, the automated tool being further configured and employed, in the event that the impact assessment determined that said security policy and said communications requirements are not compatible, to
      i) automatically adjust at least one of
         A) said representation of a network,
         B) said security policy and
         C) said communications requirements and, thereafter,
      ii) automatically carry out further impact assessment to determine whether the security policy and the communications requirements are compatible, the automated tool being still further configured and employed to assess the impact of the introduction of the application into a real network before the application is introduced into a real network, and
   e) automatically adjusting said security policy, wherein in the event that said communications requirements are not met at said network node, said security policy is relaxed, and in the event that said communications requirements are exceeded at said network node, said security policy is tightened.

18. A method as claimed in claim 17 which is performed before the particular application is introduced into a real network.

\* \* \* \* \*